United States Patent [19]
Feider et al.

[11] Patent Number: 6,142,200
[45] Date of Patent: Nov. 7, 2000

[54] TRUCK STEER TIRE TREAD INCLUDING CIRCUMFERENTIAL GROOVES

[75] Inventors: Georges Gaston Feider, Bettborn; Jean-Michel Gillard, Mersch, both of Luxembourg; Susan Marie Spaeth, Fairlawn, Ohio

[73] Assignee: The Goodyear Tire & Rubber Company, Akron, Ohio

[21] Appl. No.: 09/063,571

[22] Filed: Apr. 21, 1998

Related U.S. Application Data

[63] Continuation-in-part of application No. 29/070,364, Apr. 29, 1997, Pat. No. Des. 394,034.

[51] Int. Cl.$^7$ .............................. B60C 11/04; B60C 11/12; B60C 11/13; B60C 101/00
[52] U.S. Cl. ............................... 152/209.14; 152/209.18; 152/209.21; 152/209.22; 152/454; 152/901; 152/DIG. 1; 152/DIG. 3
[58] Field of Search .................. 152/209.14, 209.15, 152/209.18, 209.21, 209.22, 209.23, 902, DIG. 1, DIG. 3, 454, 900, 901

[56] References Cited

U.S. PATENT DOCUMENTS

| | | | |
|---|---|---|---|
| D. 296,544 | 7/1988 | Matsushita et al. | D12/147 |
| D. 394,034 | 5/1998 | Feider et al. | D12/147 |
| 2,604,920 | 7/1952 | Kirby | 152/209.18 |
| 2,756,797 | 7/1956 | Campbell . | |
| 3,707,177 | 12/1972 | Boileau | 152/209 |
| 3,799,230 | 3/1974 | Montagne | 152/209 |
| 4,217,942 | 8/1980 | Takigawa et al. | 152/209 |
| 4,271,885 | 6/1981 | Takigawa et al. . | |
| 4,446,901 | 5/1984 | Endo et al. . | |
| 4,819,704 | 4/1989 | Misawa et al. | 152/902 |

(List continued on next page.)

FOREIGN PATENT DOCUMENTS

| | | | |
|---|---|---|---|
| 348335 | 12/1989 | European Pat. Off. | 152/209.22 |
| 2204355 | 9/1972 | Germany | B60C 11/04 |
| 2849577 | 11/1978 | Germany | B60C 11/04 |
| 2951444 | 7/1980 | Germany | 152/209.21 |
| 50-98002 | 8/1975 | Japan | 152/DIG. 1 |
| 63-134312 | 6/1988 | Japan | 152/209.22 |
| 1-153304 | 6/1989 | Japan | 152/209.21 |

(List continued on next page.)

*Primary Examiner*—Steven D. Maki
*Attorney, Agent, or Firm*—Roger D Emerson

[57] ABSTRACT

A new pneumatic radial ply truck tire 10 for use on steering axles has a tread 12 with a pair of centerline grooves 14 and a pair of shoulder grooves 16 that divide the tread 12 into a pair of shoulder rows 24, a pair of riding rows 26 and a center row 28. Lateral grooves 20 divide the rows into block elements 22. The centerline grooves 14 and shoulder grooves 16 have top, middle and bottom potions 30, 32, 34 and 36, 38, 40. The top portions 30, 36 have straight sides 42, 48 that are angled at top angles A1, A2 respectively. The middle portions 32, 38 also have straight sides 44, 50 that are angled at middle angles A3, A4 respectively. To provide the grooves 14, 16 with a general V-shape, it is preferred that the middle angles A3, A4 be greater than their respective top angles A1, A2 respectively. The bottom portions 34, 40 are U-shaped and have bottom widths X1 and bottom depths D1, D2 respectively. These U-shaped bottom portions 34, 40 are wide enough to permit a tread gauge to be inserted for measuring the non-skid depth yet, are narrow enough to prevent stones of significant size from entering. The lateral grooves 20 that extend across the two riding rows 26 and the center row 28 have top portions 58, 64 and bottom portions 60, 66. The bottom portions 60, 66 have second widths W2, W4 and second depths D4, D6 that extend to at least 50% of the tread non-skid depth D. The center row 28 and the riding rows 26 are formed at a tread arc radius TAR. The shoulder rows 24 have inside edges lowered a first distance D10 with respect to the tread arc radius TAR and outside edges that are raised a second distance D11 with respect to the tread arc radius TAR. This single radius plus mixed shoulder off-set design reduces irregular wear and helps in achieving equal pressure distribution across the surface of the tread 12.

14 Claims, 8 Drawing Sheets

U.S. PATENT DOCUMENTS

| | | | |
|---|---|---|---|
| 5,246,049 | 9/1993 | Ramcke et al. | 152/209.21 |
| 5,361,816 | 11/1994 | Hitzky | 152/209 |
| 5,388,625 | 2/1995 | White | 152/209 |
| 5,503,207 | 4/1996 | Ochiai et al. | 152/209 |
| 5,909,756 | 6/1999 | Miyazaki | 152/DIG. 3 |

FOREIGN PATENT DOCUMENTS

| | | | |
|---|---|---|---|
| 2-81704 | 3/1990 | Japan | 152/454 |
| 1289657 | 9/1972 | United Kingdom . | |
| 1407050 | 9/1975 | United Kingdom . | |
| 2038729 | 7/1980 | United Kingdom . | |
| 2142885 | 1/1985 | United Kingdom . | |

TRUCK STEER TIRE TREAD INCLUDING CIRCUMFERENTIAL GROOVES

The applicant for this non-provisional continuation-in-part utility application hereby claims priority based on the prior design application titled TIRE TREAD, filed on Apr. 29, 1997 and assigned application Ser. No. 29/070,364 now U.S. Pat. No. D 394,034.

BACKGROUND

The present invention relates to truck tire treads and tires for steer axles.

The use of treads specifically designed for the steer axle of truck tires is well known in the art. It is also known, however, that improvements were desired.

One problem is related to stones. It is known in the art for stones to become trapped or held within the grooves of the tread. Such stones may damage the groove bottoms and the belt-package that lies beneath the tread. Such damage caused by stones is known as "stone drilling."

Another problem relates to irregular wear in the shoulder ribs of steer tires. Such irregular shoulder wear is known to produce peaking on the inside edge of the shoulder rib and drop off on the outside edge of the shoulder rib.

The applicants have also noticed that, even though the molds used to produce steer tires are typically made with an equal width for shoulder and centerline grooves, the tire when in use may produce a footprint having shoulder grooves that are opened-up or greater in width than the centerline grooves. This opening of the shoulder grooves relative to the centerline grooves results in a lower local net-to-gross ratio. Since the same load must be carried, the footprint length increases locally yielding peaking around the shoulder grooves.

The present invention provides circumferential grooves that are wide enough to permit a tread gauge to be used to measure the full intended non-skid depth, yet are narrow enough to prevent any stones of significant size to enter the grooves. The present invention also minimizes irregular shoulder wear by using a single radius plus "mixed" shoulder off-set design.

SUMMARY OF THE INVENTION

A new pneumatic radial ply truck tire 10 for use on steering axles is described. The tire 10 has a tread 12 with a pair of centerline grooves 14 and a pair of shoulder grooves 16 that divide the tread 12 into a pair of shoulder rows 24, a pair of riding rows 26 and a center row 28. Lateral grooves 20 divide the rows into block elements 22. The centerline grooves 14 have top, middle and bottom potions 30, 32, 34. The shoulder grooves 16 similarly have top, middle and bottom portions 36, 38, 40. The top portions 30, 36 have straight sides 42, 48 that are angled at top angles A1, A2 respectively. The middle portions 32, 38 also have straight sides 44, 50 that are angled at middle angles A3, A4 respectively. To provide the grooves 14, 16 with a general V-shape, it is preferred that the middle angles A3, A4 be greater than their respective top angles A1, A2 respectively.

The bottom portions 34, 40 are U-shaped and have bottom widths X1 and bottom depths D1, D2 respectively. These U-shaped bottom portions 34, 40 are wide enough to permit a tread gauge to be inserted for measuring the non-skid depth yet, are narrow enough to prevent stones of significant size from entering. Preferably, the U-shaped bottom portions 34, 40 have bottom widths X1 and bottom depths D1, D2 that are less than 2.0 mm.

The sides 42, 48 of the top portions 30, 36 are linked to the respective sides 44, 50 of the middle portions 32, 38 with radii within the range of 5.0 mm to 15.0 mm. The sides 44, 50 of the middle sections 32, 38 are linked to the respective sides 46, 52 of the bottom portions 34, 40 with S-shaped links having two radii each within the range of 3.0 mm to 6.0 mm.

The lateral grooves 20 that extend across the two riding rows 26 and the center row 28 have top portions 58, 64 and bottom portions 60, 66. The top portions have first widths W1, W3 and first depths D3, D5 that extend to less than 20% of the tread non-skid depth D. The bottom portions 60, 66 have second widths W2, W4 and second depths D4, D6 that extend to at least 50% of the tread non-skid depth D. In this way the lateral grooves 20 help in providing the tire 10 with an even wear profile, high mileage and safe wet performance.

The center row 28 and the riding rows 26 are formed at a tread arc radius TAR. The shoulder rows 24 have inside edges lowered a first distance D10 with respect to the tread arc radius TAR and outside edges that are raised a second distance D11 with respect to the tread arc radius TAR. Preferably the first distance D10 is less than 1.0 mm and the second distance D11 is greater than 1.0 mm. This single radius plus mixed shoulder off-set design reduces irregular wear. The two shoulder rows 24 have a shoulder width SHW and the two riding rows 26 and the center row 28 each have a center width CW. A width ratio equal to SHW divided by CW is at least 1.35. This helps in achieving equal pressure distribution across the surface of the tread 12.

Thus, the tire 10 of this invention having the tread 12 can exhibit a high wear rate and an even wear profile. It also protects the groove bottoms 34, 40 and belt-package 13 from damage due to stones.

DEFINITIONS

"Axial" and "axially" means lines or directions that are parallel to the axis of rotation of the tire.

"Block Element" means a tread element defined by a circumferential groove or shoulder and a pair of lateral extending grooves.

"Circumferential" means lines or directions extending along the perimeter of the surface of the annular tread perpendicular to the axial direction.

"Equatorial Plane (EP)" means the plane perpendicular to the tire's axis of rotation and passing through the center of its tread.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion, the width of which is in question, divided by the length of such groove or groove portion; thus, the groove width is it average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tire bars" tending to maintain a rib-like character in the tread region involved.

"Lateral" means an axial direction.

"Net-to-gross ratio" means the total area of ground contracting tread elements between the lateral edges around the entire circumference of the tread divided by the gross area of the entire tread between the lateral edges.

"Radially" and "radially" means directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Rib" means a circumferentially extending strip of rubber of the tread which is defined by at least one circumferential groove and either a second such groove or a lateral edge, the strip being laterally undivided by full-depth grooves.

"Shoulder" means the upper portion of sidewall just below the tread edge; tread shoulder or shoulder rib means that portion of the tread near the shoulder.

"Sipe" means small slots molded into the tread elements of the tire that subdivide the tread surface and improve traction.

"Tread" means a rubber or elastomeric component including that portion of the tire that comes into contact with the road under normal inflation and load.

"Tread element" or "traction element" means a rib or a block element.

DETAILED DESCRIPTION OF THE PREFERRED EMBODIMENT

Referring now to the drawings wherein the showings are for purposes of illustrating a preferred embodiment of the invention only and not for purposes of limiting the same, FIGS. 1–6 show a pneumatic radial ply truck tire 10 for use on the steering axles that has a tread 12 with a non-skid depth D. The tread 12 provides a high wear rate and an even wear profile as will be discussed further below. The tread 12 includes four circumferential grooves including two centerline grooves 14 and two shoulder grooves 16 that divide the tread 12 into five rib parts 18. Lateral grooves 20 extend across the five rib parts 18 of the tread 12 to form five rows of circumferentially separated block elements 22 including two shoulder rows 24, two riding rows 26 and a center row 28.

Figure 1:
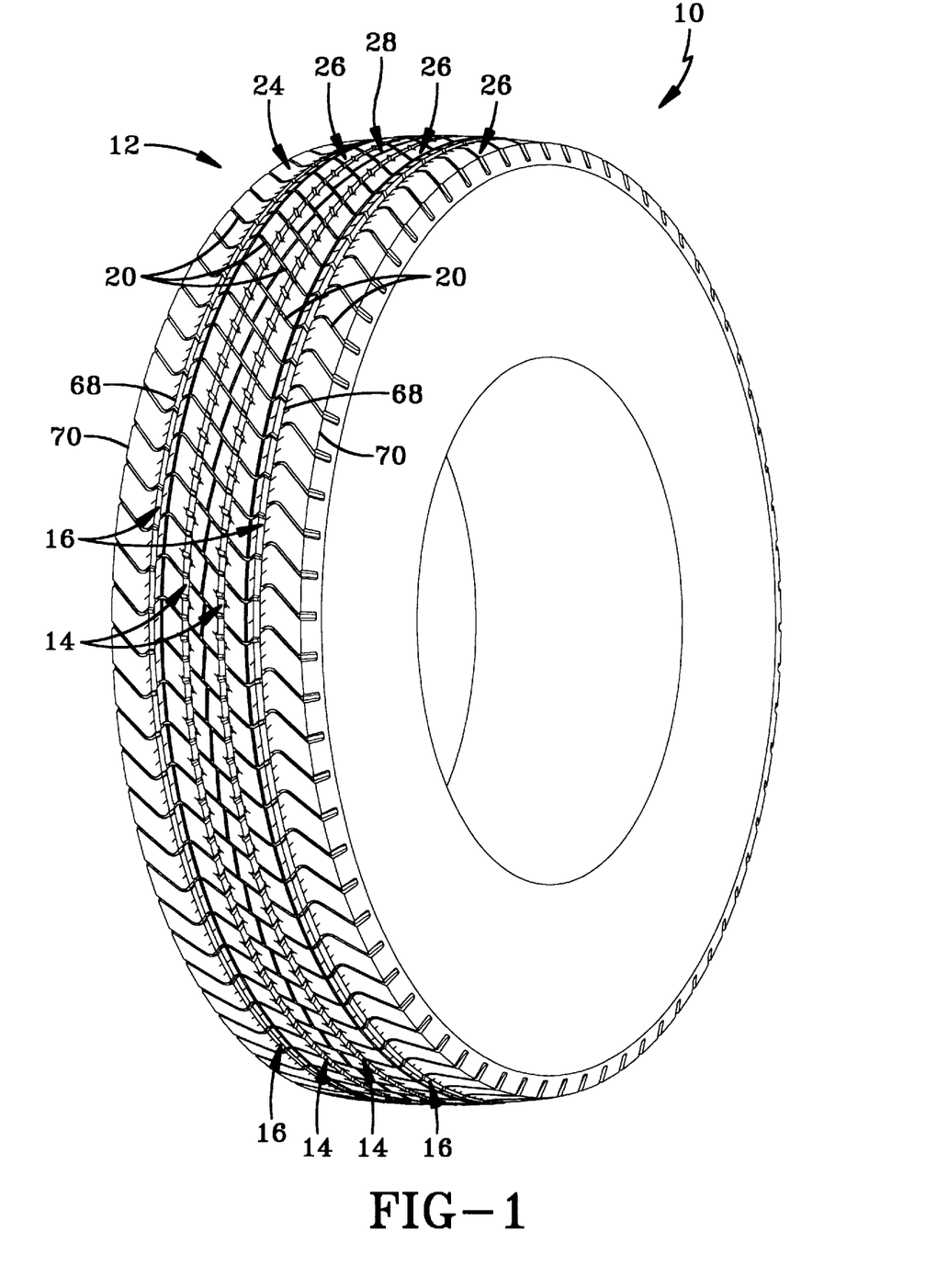
FIG. 1 is a perspective side elevation view of the tire 10 according to the present invention.
Figure 2:
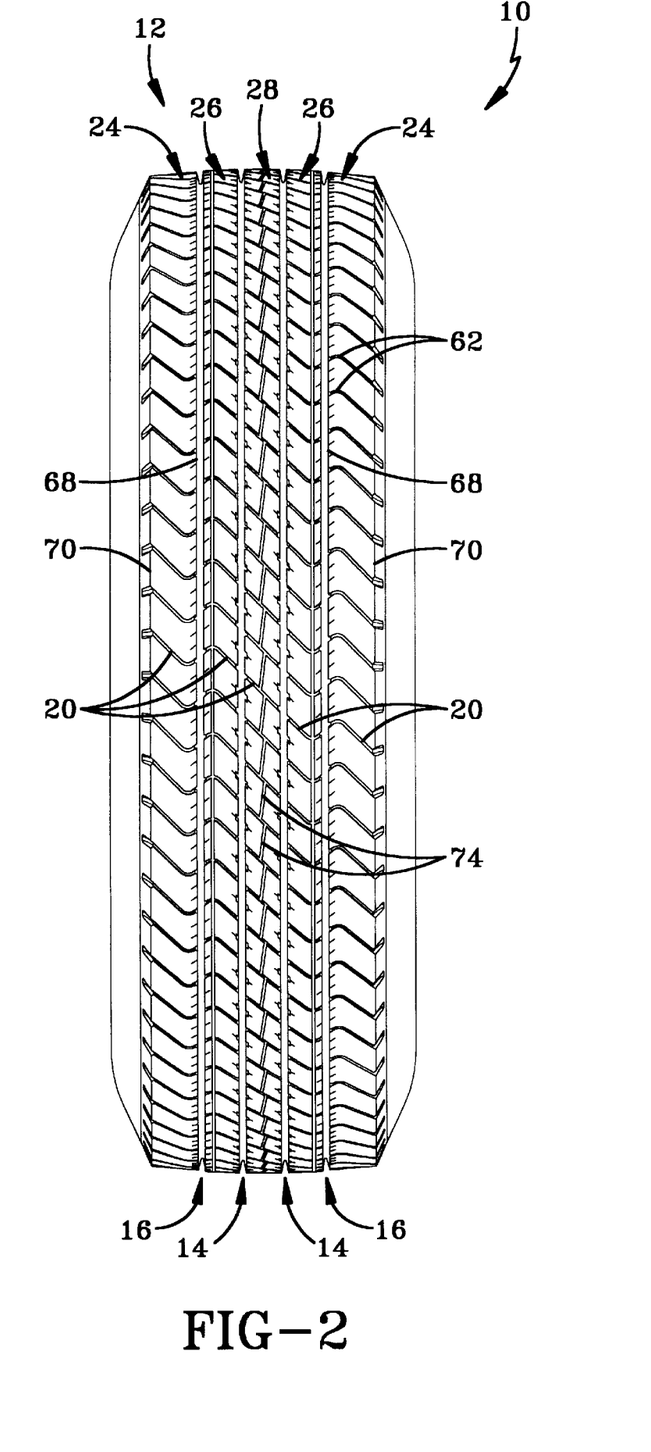
FIG. 2 is a perspective front elevation view of the tire 10 of FIG. 1.
Figure 3:
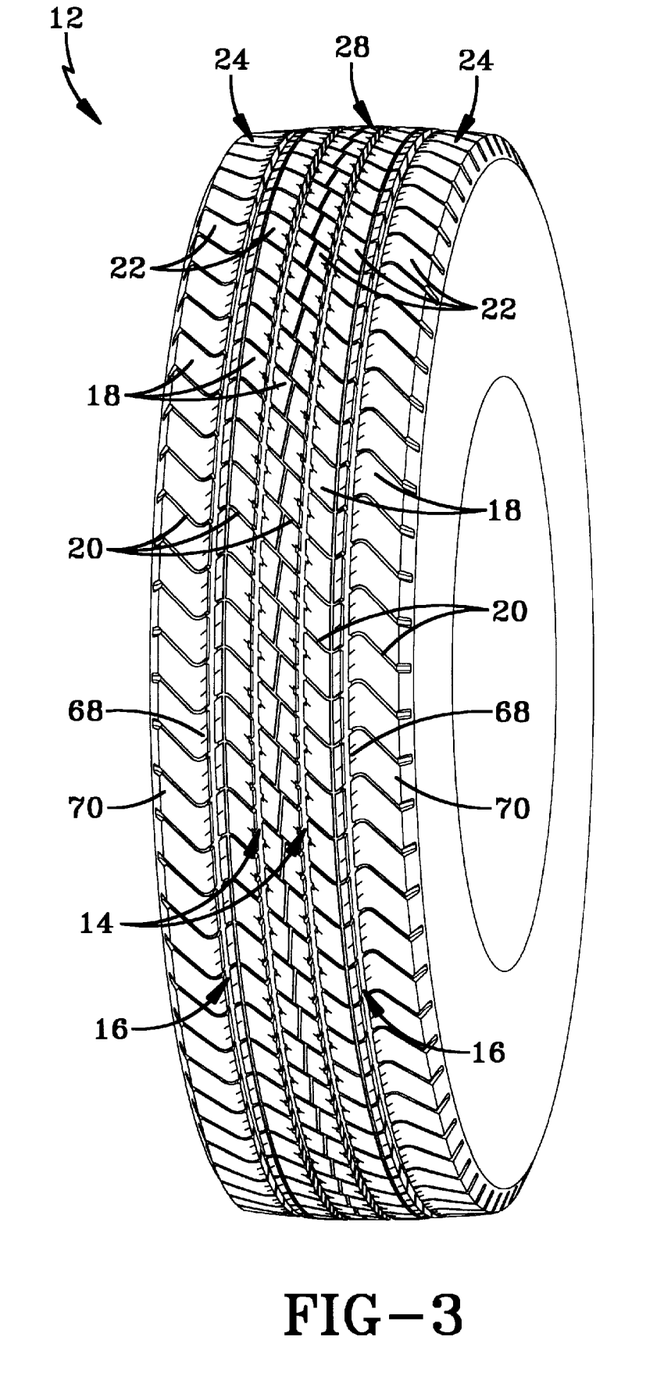
FIG. 3 is a perspective elevation view of the tread 12 of FIG. 1.
Figure 4:
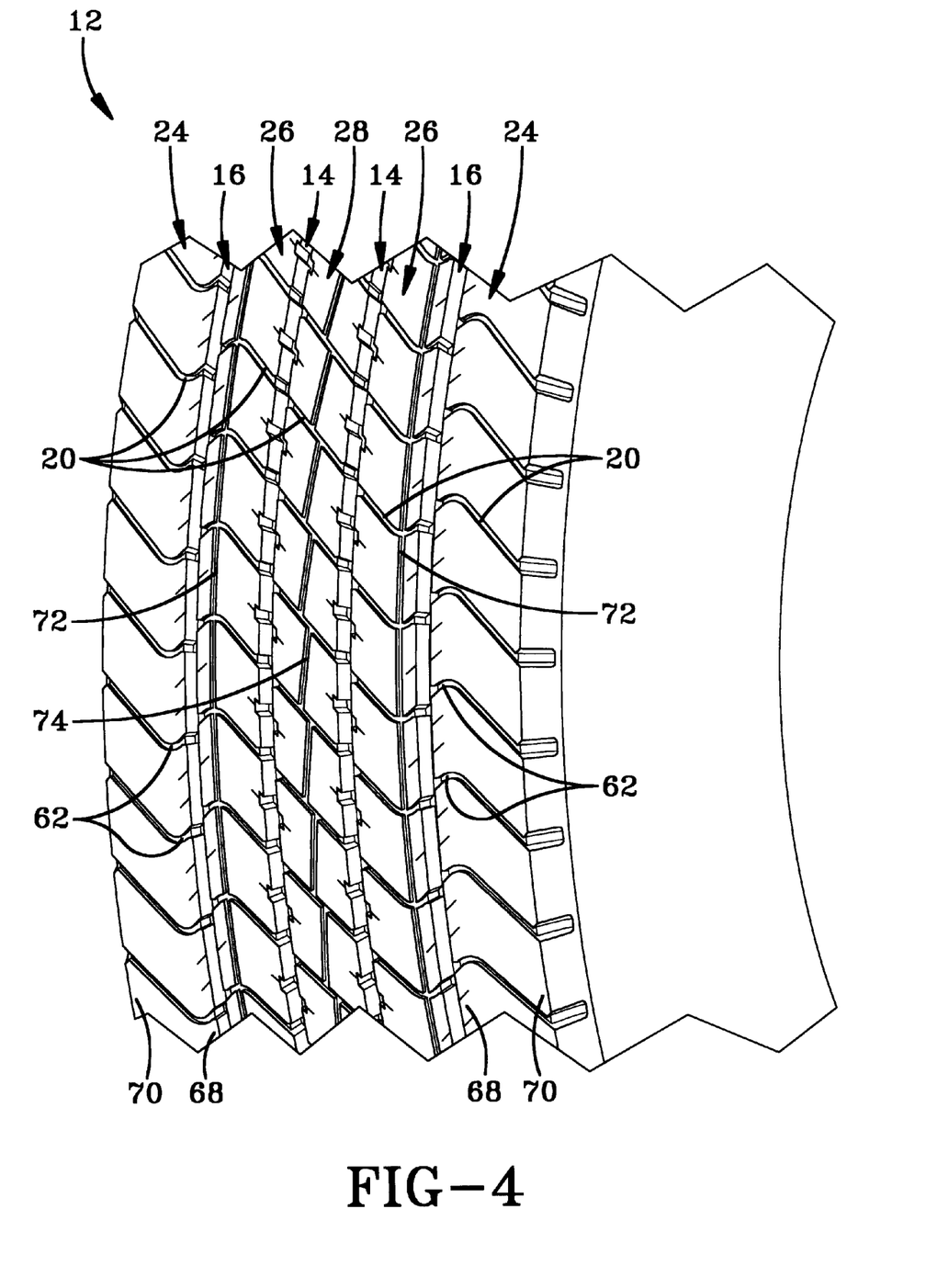
FIG. 4 is a perspective side view of a portion of the tread pattern of the tread shown in FIG. 1.
Figure 5:
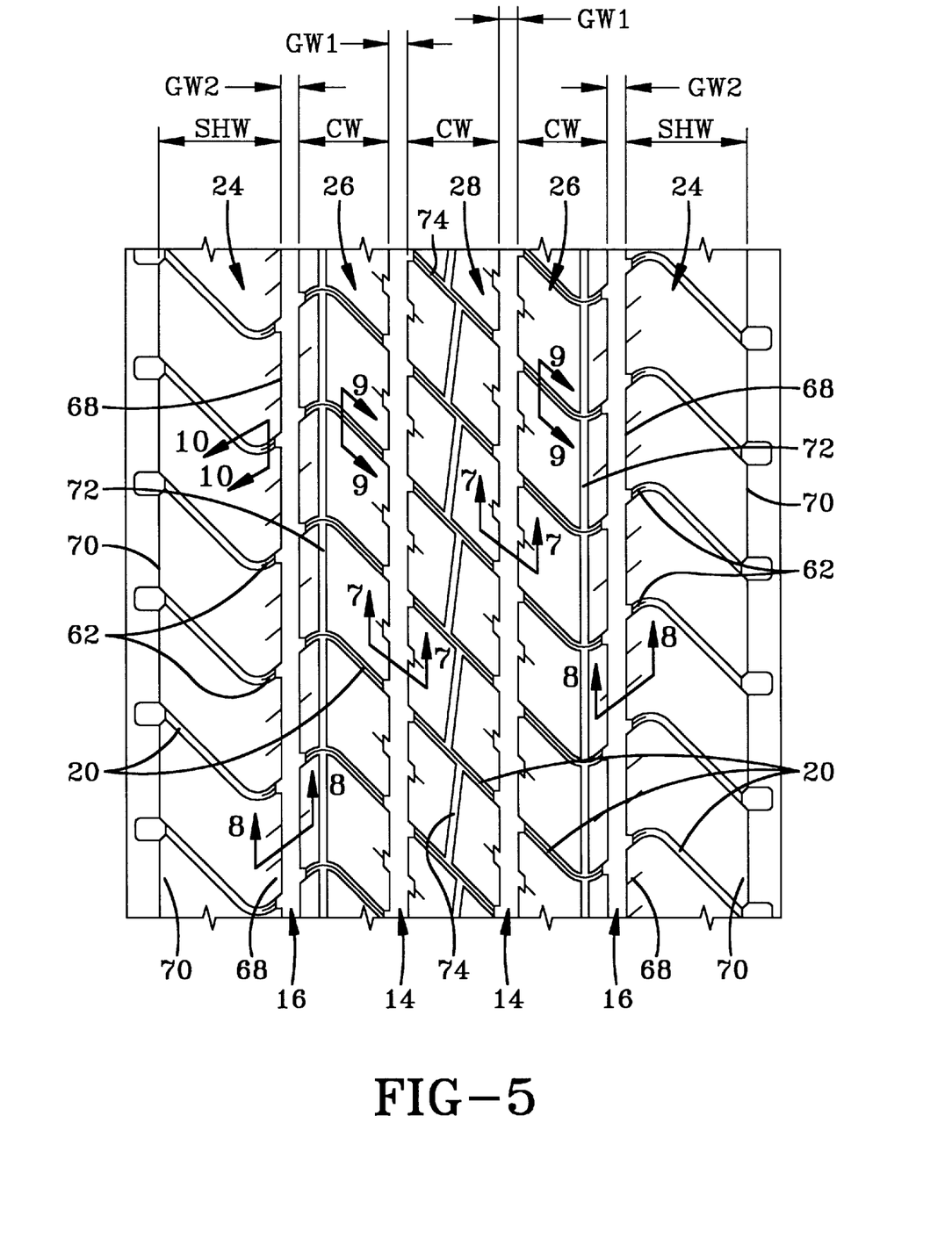
FIG. 5 is a view of a portion of the tread pattern of the tread shown in FIG. 3.
Figure 6:
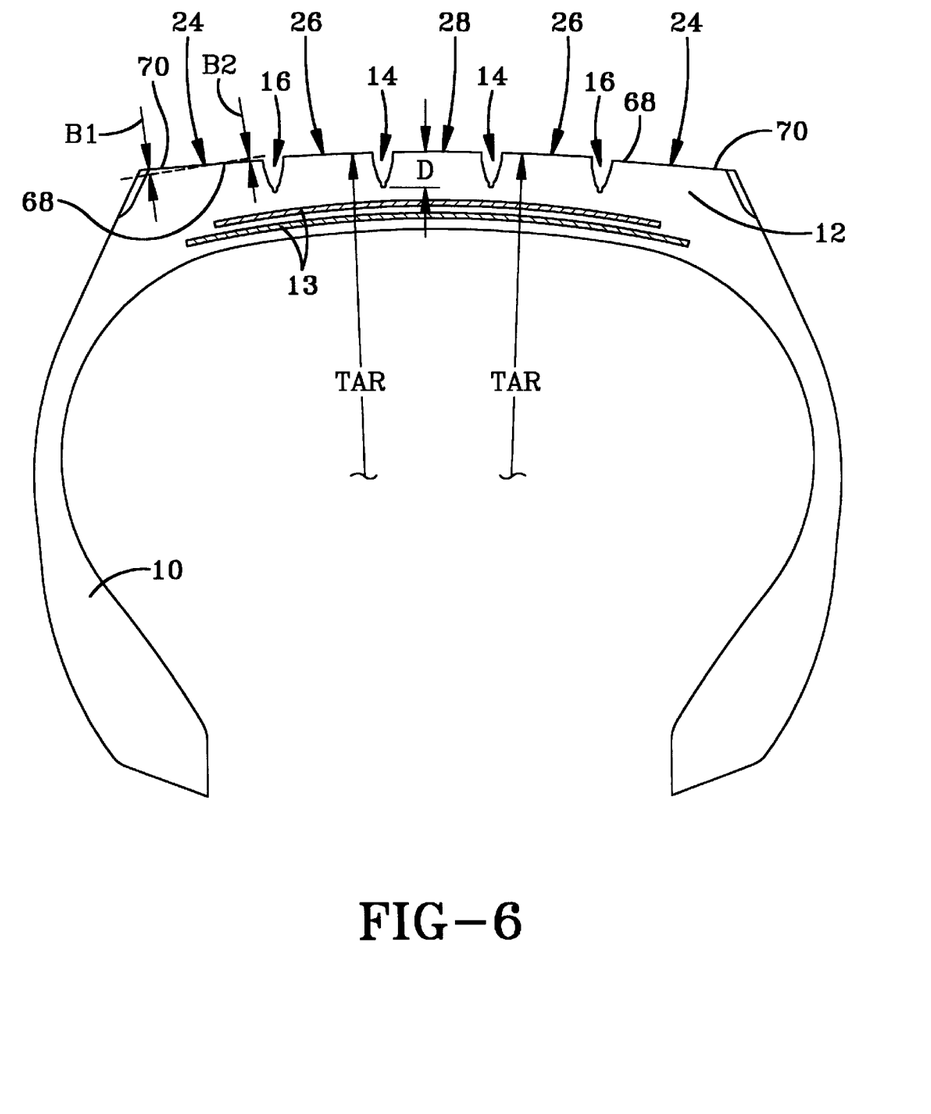
FIG. 6 is a cross-sectional view of a tire 10 according to the present invention.
Figure 7:
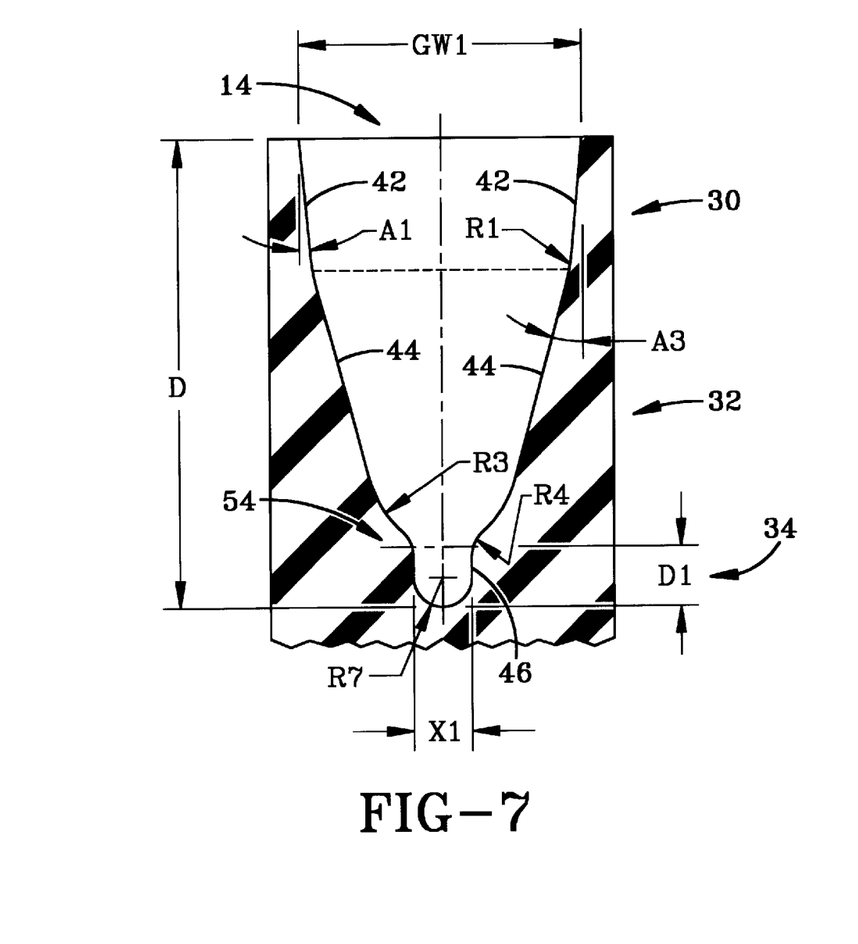
FIG. 7 is a sectional view of the centerline grooves taken along the line 7—7 of FIG. 5.
Figure 8:
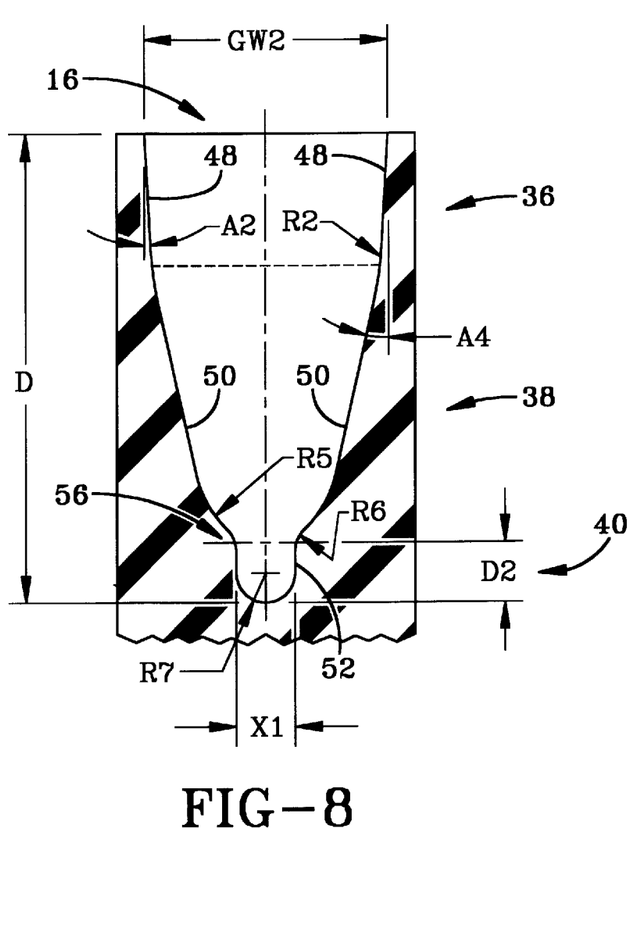
FIG. 8 is a sectional view of the shoulder grooves 16 taken along the lines 8—8 of FIG. 5.
Figure 9:
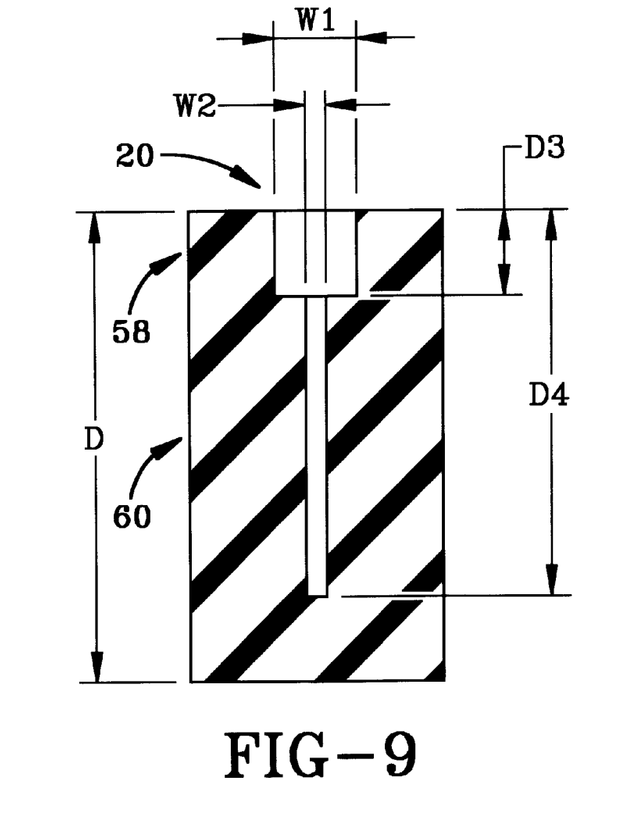
FIG. 9 is a sectional view of the lateral grooves 20 in the center row 28 and riding rows 26 taken along the lines 9—9 of FIG. 5.

With reference now to FIGS. 1–8, in order to minimize possible stone damage to the grooves or the belt-package 13 caused by stones being trapped or held within the grooves, the two centerline grooves 14 and the two shoulder grooves 16 each have top 30, 36, middle 32, 38 and bottom portions 34, 40 respectively. The top portions 30, 36 have straight sides 42, 48 angled at top angles A1, A2 relative to radial lines extending from the edges of the grooves at the maximum groove width as shown in FIGS. 7–8. The middle portions 32, 38 also have straight sides 44, 50 that are angled at middle angles A3, A4 with respect to the radial lines extending from the edges of the grooves at the maximum groove width. To provide the grooves 14, 16 with a general V-shape, it is preferred that the middle angles A3, A4 be greater than their respective top angles A1, A2 respectively. This provide for increased groove wall taper angles positioned where they are the most useful for stone ejection, in the lower portion of the grooves 14, 16. It is most preferred that the top angles A1, A2 be within the range of greater than 0° to 10° and that the middle angles A3, A4 be within the range of 10° to 20°.

With reference now to FIGS. 7–8, the bottom portions 34, 40 are U-shaped with bottom widths X1, bottom depths D1, D2 and radii R7. The bottom depths D1, D2 are preferably less than 15% of the tread non-skid depth D. The fact that the grooves 14, 16 will close significantly as the tread wears to the point of the bottom portions 34, 40 resulting in a worn-out looking tread pattern, is irrelevant because at that stage truck tires have reached the top of the legally require tread-wear indicators. It is also preferred that the bottom widths X1 and the bottom depths D1, D2 each be less than 2.0 mm. In this way the U-shaped bottom portions 34, 40 are wide enough to allow a tread gauge to be used to measure the full intended non-skid depth and yet narrow enough to prevent any stones of significant size from entering.

Still referring to FIGS. 7–8, the sides 42, 48 of the top portions 30, 36 are linked to the sides 44, 50 of the middle portions 32, 38 by radii R1, R2 respectively. It is most preferred that the radii R1, R2 each be within the range of 5.0 mm to 15.0 mm to provide a smooth transition from the top portions 30, 36 to the middle portions 32, 38. The sides 44, 50 of the middle portions 32, 38 are linked to respective sides 46, 52 of the bottom portions 34, 40 by S-shaped links 54, 56. The links 54, 56 provide a short yet corner-less transition to the narrow bottom portions 34, 40. The S-shaped links 54, 56 are formed using two first radii R3, R5 and two second radii R4, R6. The radii R3, R4, R5, R6 each are preferably within the range of 3.0 mm to 6.0 mm. These relatively large radii ensure that the U-shaped bottom portions 34, 40 are narrow enough to prevent stones yet the middle portions 32, 38 are wide enough to provide appropriate traction.

With reference now to FIGS. 5–8, as noted above, the applicants have noticed that steer tires may demonstrate a footprint having shoulder grooves that are opened-up or greater in width than the centerline grooves even when molded to be the same size. This is believed to increase the footprint length locally and thereby cause peaking around the shoulder grooves. Thus, the preferred tread 12 has centerline grooves 14 with first groove widths GW1 and shoulder grooves 16 with first groove widths GW2 where a groove width ratio equal to GW2 divided by GW1 is less than 0.90.

With reference now to FIGS. 1–6 and 9, the lateral grooves 20 that extend across the two riding rows 26 and the center row 28 have top portions 58 and bottom portions 60 respectively. The top portions have first widths W1 and first depths D3 that extend to less than 20% of the tread non-skid depth D. The bottom portions 60 have second widths W2 and second depths D4 that extend to at least 50% of tread non-skid depth D. This design provides block elements 22 that will provide even wear, high mileage and safe wet performance. It is most preferred that the second depths D4 extend to at least 75% of tread non-skid depth D. The bottom portions 60 are formed by blades (not shown) inserted into the truck tire molds (not shown). These blades provide for bottom portions 60 that extend to a constant depth level.

Figure 10:
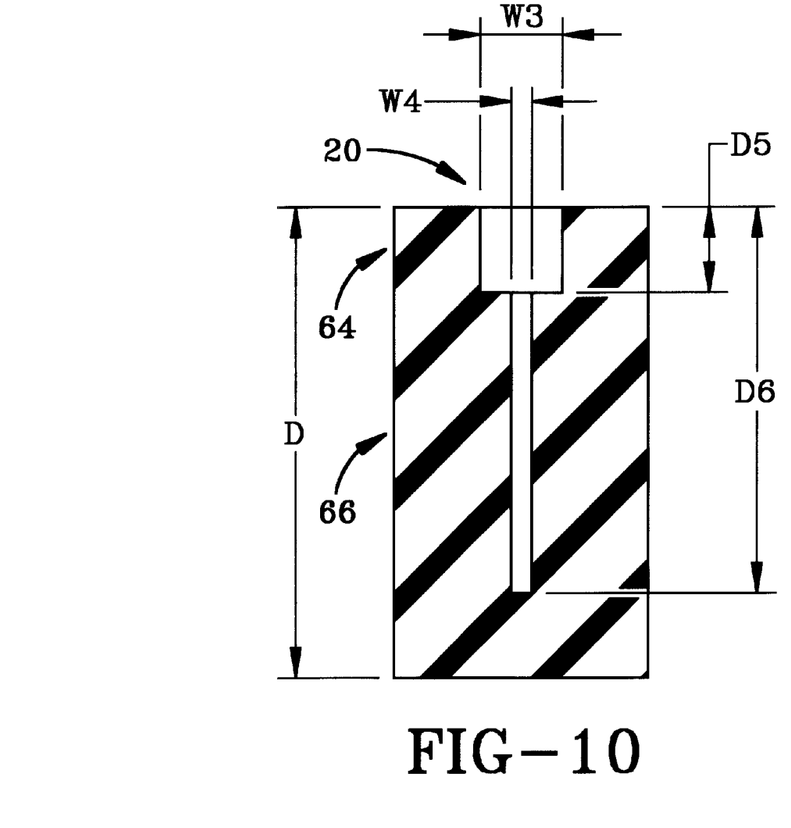
FIG. 10 is a sectional view of the lateral grooves 20 in the shoulder rows 24 taken along the lines 10—10 of FIG. 5.

With reference now to FIGS. 5 and 10, it can be seen that the lateral grooves 20 that extend across the two shoulder rows 24 have inside ends 62 comprising top portions 64 and bottom portions 66. The top portions 64 have first widths W3 and first depths D5 that preferably extend to less than 20% of the tread non-skid depth D. The bottom portions 66 have a second width W4 and a second depth D6 that preferably extends to at least 50% of the tread non-skid depth D. The bottom portions 66 are formed with blades as discussed above. The remaining parts of the lateral grooves 20 that extend across the two shoulder rows 24 do not have bottom portions but maintain the first width W3 and the first depth D5 across the shoulder rows 24.

With reference to FIGS. 1–5 some skilled in the art have determined that lateral grooves angled at approximately 45° relative to the tire centerline produce the lowest noise level. For this reason the lateral grooves 20 extending across the center row 28 are angled at approximately 45°. Also to minimize noise, the major parts (meaning more than 50% of the length of the groove) of the lateral grooves 20 extending across the riding rows 26 and the shoulder rows 24 are also angled at approximately 45°.

With reference now to FIGS. 1–6, the applicants believe that irregular shoulder wear can be initiated where groove edge amplitudes create variations in lateral stiffness. These variations may be caused by rib width variations, groove taper angle changes, notches, blades, and other design modifications as well. The effect of these amplitudes are believed to decrease with the tread non-skid depth level. In other words, the effects of the amplitudes are at their greatest in the new, unworn tire and are the greatest for deep tread non-skid depth D steer tires on trucks. Therefore to minimize the potential for irregular shoulder wear and to minimize the noise levels, the shoulder rows 24 have inside edges 68 that are straight in the circumferential direction. It should be noted that the inside edges 68 are straight in the circumferential direction regardless of the tread non-skid depth.

with reference now to FIG. 5–6, irregular shoulder wear creates shoulder peaking and shoulder drop-off. Peaking refers to areas of the tread surface that are radially higher than the rest of the tread surface and drop-off refers to the areas of the tread surface that are worn more (radially lower) than the rest of the tread surface. To combat shoulder peaking and shoulder drop-off, the tread 12 of this invention is formed by what is termed a mixed shoulder off-set. As shown in FIG. 6 the center row 28 and the riding rows 26 have a tread arc radius TAR. The shoulder rows 24 however are not radiused. FIG. 6 shows in a dashed line the tread arc radius TAR for the shoulder row area. As can be seen, the inside edges 68 of the shoulder rows 24 are lower by a first distance D10 with respect to the tread arc radius TAR. The outside edges 70, on the other hand, are raised a second distance D11 with respect to the tread arc radius TAR. In this way, the tread surface of the shoulder rows 24 is not radiused but rather is flat. In the preferred embodiment, the first distance D10 is less than 1.0 mm and the second distance D11 is greater than 1.0 mm. This mixed shoulder off-set design is expected to shift pressure from the inside edge 68 of the shoulder rows 24 where peaking is known to occur to the outside edges 70 where drop-off occurs. Therefore, a more even pressure distribution will be obtained. To further combat shoulder peaking and shoulder drop-off, the two shoulder rows 24 have larger widths than the two riding rows 26 and the center row 28. In particular, the shoulder rows 24 each have a shoulder width SHW and the two riding rows 26 and the center row 28 each have a center width CW. A width ratio equal to SHW divided by CW is preferably at least 1.35.

with reference now to FIGS. 1–6, the tread 12 also includes circumferentially extending circumferential grooves 72 within the riding rows 26. It also includes nearly circumferential grooves 74 in the center row 28 that link the lateral grooves 20 in the center row 28. These grooves 74, 76, are relatively shallow having a depth preferably equal to the first depth D3 and have a width less than 3.0 mm. To maintain a high wear rate, it is also preferred that the tread 12 has a relatively high net-to-gross ratio. Most preferably the net-to-gross ratio is over 80%.

The invention has been described with reference to preferred embodiments. Obviously, modifications and alterations will occur to others upon a reading and understanding of the specification. It is intended to include all such modifications and alterations in so far as they come within the scope of the appended claims or the equivalence thereof.

Having thus described the invention, it is now claimed:

1. A pneumatic radial ply truck tire for use on steering axles of trucks, the tire having a tread, the tread having a tread non-skid depth, four circumferential grooves including two centerline grooves and two shoulder grooves, the four circumferential grooves dividing the tread into five rib parts, the tread also having lateral grooves extending across the five rib parts of the tread to form five rows of circumferentially-separated block elements including two shoulder rows, two riding rows and a center row, the tire being characterized by:

the two centerline grooves and the two shoulder grooves each having top, middle and bottom portions, the top portions having straight sides each angled at a top angle with respect to one of radial lines extending from the edges of the grooves at the maximum groove width, the middle portions having straight sides each angled at a middle angle with respect to one of the radial lines extending from the edges of the grooves at the maximum groove width, the middle angles being greater than the top angles, the bottom portions being U-shaped with a bottom depth that is less than 15% of the tread non-skid depth, the U-shaped bottom portions of the two centerline grooves and the two shoulder grooves each having a bottom width and a bottom depth less than 2.0 mm;

the lateral grooves extending across the two riding rows and the center row having top and bottom portions, the top portions having a first width and a first depth that extends to less than 20% of the tread non-skid depth, the bottom portions having a second width and a second depth that extends to at least 50% of the tread non-skid depth, the second width being less than 30% of the first width; and, the lateral grooves extending across the two shoulder rows having inside ends comprising top and bottom portions, the top portions having a first width and a first depth that extends to less than 20% of the tread non-skid depth, the bottom portions having a second width and a second depth that extends to at least 50% of the tread non-skid depth, the remaining parts of the lateral grooves extending across the two shoulder rows having a width equal to the first width of the top portions and a depth equal to the first depth of the top portions.

2. The pneumatic radial ply truck tire of claim 1 wherein the top angles are greater than 0° and less than or equal to 10° and the middle angles are greater than 10° and less than or equal to 20°.

3. The pneumatic radial ply truck tire of claim 2 wherein the straight sides of the top portions and the straight sides of the middle portions are linked with a radius within the range of 5.0 mm to 15.0 mm.

4. The pneumatic radial ply truck tire of claim 3 wherein the straight sides of the middle portions and the sides of the U-shaped bottom portions are linked with S-shaped links, each link having two radii within the range of 3.0 mm to 6.0 mm.

5. The pneumatic radial ply truck tire of claim 1 wherein the two centerline grooves each have a first groove width GW1 and the two shoulder grooves each have a first groove width GW2, a groove width ratio equal to GW2 divided by GW1 is less than 0.90.

6. The pneumatic radial ply truck tire of claim 1 wherein the lateral grooves extending across the center row are angled at approximately 45° with respect to the centerline and a major part of the lateral grooves extending across the riding rows and the shoulder rows are angled at approximately 45° with respect to the centerline.

7. The pneumatic radial ply truck tire of claim 1 wherein the two shoulder rows each have inside edges that are straight in the circumferential direction.

8. The pneumatic radial ply truck tire of claim 1 wherein the center row and the riding rows have a tread arc radius TAR and the shoulder rows have inside edges lowered a first distance D10 with respect to TAR and outside edges raised a second distance D11 with respect to TAR.

9. The pneumatic radial ply truck tire of claim 8 wherein the shoulder rows have a flat tread surface.

10. The pneumatic radial ply truck tire of claim 9 wherein the first distance D10 is less than 1.0 mm and the second distance D11 is greater than 1.0 mm.

11. The pneumatic radial ply truck tire of claim 1 wherein the two shoulder rows each have a shoulder width SHW and the two riding rows and center row each have a center width CW, a width ratio equal to SHW divided by CW is at least 1.35.

12. A pneumatic radial ply truck tire for use on steering axles of trucks, the tire having a tread, the tread having a tread non-skid depth, four circumferential grooves including two centerline grooves and two shoulder grooves, the four circumferential grooves dividing the tread into five rib parts, the tread also having lateral grooves extending across the five rib parts of the tread to form five rows of circumferentially-separated block elements including two shoulder rows, two riding rows and a center row, the tire being characterized by:

the two centerline grooves and the two shoulder grooves each having top, middle and bottom portions, the top portions having straight sides each angled at a top angle with respect to one of radial lines extending from the edges of the grooves at the maximum groove width, the middle portions having straight sides each angled at a middle angle with respect to one of radial lines extending from the edges of the grooves at the maximum groove width, the middle angles being greater than the top angles, the bottom portions being U-shaped with a bottom depth that is less than 15% of the tread non-skid depth, the U-shaped bottom portions of the two centerline grooves and the two shoulder grooves each having a bottom width and a bottom depth less than 2.0 mm; and, the lateral grooves extending across the two shoulder rows having inside ends comprising top and bottom portions, the top portions having a first width and a first depth that extends to less than 20% of the tread non-skid depth, the bottom portions having a second width and a second depth that extends to at least 50% of the tread non-skid depth, the remaining parts of the lateral grooves extending across the two shoulder rows having a width equal to the first width of the top portions and a depth equal to the first depth of the top portions.

13. The pneumatic radial ply truck tire of claim 12 wherein the lateral grooves extending across the center row are angled at approximately 45° with respect to the centerline and a major part of the lateral grooves extending across the riding rows and the shoulder rows are angled at approximately 45° with respect to the centerline.

14. A pneumatic radial ply truck tire for use on steering axles of trucks, the tire having a tread, the tread having a tread non-skid depth, four circumferential grooves including two centerline grooves and two shoulder grooves, the four circumferential grooves dividing the tread into five rib parts, the tread also having lateral grooves extending across the five rib parts of the tread to form five rows of circumferentially-separated block elements including two shoulder rows, two riding rows and a center row, the tire being characterized by:

the two centerline grooves and the two shoulder grooves each having top, middle and bottom portions;

the top portions having straight sides each angled at a top angle measuring greater than 0° and less than or equal to 10° with respect to one of radial lines extending from the edges of the grooves at the maximum groove width;

the middle portions having straight sides each angled at a middle angle measuring greater than 10° and less than or equal to 20° with respect to one of radial lines extending from the edges of the grooves at the maximum groove width, the middle angles being greater than the top angles, the straight sides of the top portions and the straight sides of the middle portions being linked with a radius within the range of 5.0 mm to 15.0 mm;

the bottom portions being U-shaped with a bottom depth that is less than 15% of the tread non-skid depth, the U-shaped bottom portions of the two centerline grooves and the two shoulder grooves each having a bottom width and a bottom depth less than 2.0 mm, the straight sides of the middle portions and the sides of the U-shaped bottom portions being linked with S-shaped links, each link having two radii within the range of 3.0 mm to 6.0 mm;

the two centerline grooves each having a first groove width GW1 and the two shoulder grooves each having a first groove width GW2 wherein a groove width ratio equal to GW2 divided by GW1 is less than 0.90;

the lateral grooves extending across the two riding rows and the center row having top and bottom portions, the top portions having a first width and a first depth that extends to less than 20% of the tread non-skid depth, the bottom portions having a second width and a second depth that extends to at least 50% of the tread non-skid depth, the second width being less than 30% of the first width;

the lateral grooves extending across the two shoulder rows having inside ends comprising top and bottom portions, the top portions having a first width and a first depth that extends to less than 20% of the tread non-skid depth, the bottom portions having a second width and a second depth that extends to at least 50% of the tread non-skid depth, the remaining parts of the lateral grooves extending across the two shoulder rows having a width equal to the first width of the top portions and a depth equal to the first depth of the top portions;

the lateral grooves extending across the center row being angled at approximately 45° with respect to the tire centerline and a major part of the lateral grooves extending across the riding rows and the shoulder rows being angled at approximately 45° with respect to the tire centerline;

the center row and the riding rows having a tread arc radius TAR and the shoulder rows having inside edges lowered a first distance D10 with respect to TAR and outside edges raised a second distance D11 with respect to TAR; and, the two shoulder rows each having a shoulder width SHW and the two riding rows and center row each having a center width CW wherein a width ratio equal to SHW divided by CW is at least 1.35.

* * * * *